US006262786B1

(12) United States Patent
Perlo et al.

(10) Patent No.: US 6,262,786 B1
(45) Date of Patent: Jul. 17, 2001

(54) DEVICES WITH MICRO-FILTERS AND MICRO-CHOPPERS FOR DYNAMIC SELECTION OF COLOURS AND IMAGES

(75) Inventors: Piero Perlo, Sommariva Bosco; Piermario Repetto, Turin; Sabino Sinesi, Piossasco, all of (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 08/827,261

(22) Filed: Mar. 28, 1997

(30) Foreign Application Priority Data

May 27, 1996 (IT) ............................................... TO96A0454

(51) Int. Cl.[7] ........................ G02F 1/1335; G02B 3/00; G02B 5/22
(52) U.S. Cl. ............................................... 349/95; 349/106
(58) Field of Search ................................... 349/57, 62, 95, 349/5, 106; 359/15, 22, 619, 626; 353/122

(56) References Cited

U.S. PATENT DOCUMENTS

| 4,985,816 | * | 1/1991 | Seko et al. ............................... 362/303 |
| 5,323,002 | * | 6/1994 | Sampsell et al. ................... 250/252.1 |
| 5,506,701 | * | 4/1996 | Ichikawa ................................. 359/15 |
| 5,764,389 | * | 6/1998 | Grinberg et al. ........................ 359/15 |
| 5,781,257 | * | 7/1998 | Gal et al. ................................ 349/95 |

FOREIGN PATENT DOCUMENTS

| 0644450 | 3/1995 | (EP) . |
| 4431749 | 3/1995 | (DE) . |
| WO 9512286 | 5/1995 | (WO) . |

OTHER PUBLICATIONS

Hamada et al. "Brightness Enhancement of an LCD Projector by a Planar Microlens Array", SID Int'l Symposium Digest of Papers, US, Playa Del Rey, SID, vol. 23, pp. 269–272.
Conference on Binary Optics, Huntsville, AL, Feb. 23–25, 1993, NASA Publication 3227, M.F. Farn et al. Color Separation Gratings, pp. 409–421.
H. Dammann "Color separation gratings", Applied Optics, vol. 17, No. 15, Aug. 1, 1978, pp. 2273–2279.
Sweeney D>W. et al. "Harmonic Diffractive Lenses", Applied Optics, U.S. Optical Socity of America, Washington, vol. 34, No. 14, pp. 2469–2475.
SID Int'l. Symposium, Digest of Technical Papers, Society for Information Display, 1991, vol. 22, pp. 427–429, M. Doebler et al. "An Improved Frame–Sequential Color Projector with Modified CdSe–TFTs".
Euro Display 93, LCP–1, pp. 249–252, P. Janse "A novel signle light valve hight brightness HD color projector".
Japan Display 92 Digest, p. 875, T. Takamatsu et al. "PD–1 Single–Panel LC Projector with a Planar Microlens Array".

* cited by examiner

Primary Examiner—William L. Sikes
Assistant Examiner—Tai V. Duong
(74) Attorney, Agent, or Firm—Sughrue, Mion, Zinn Macpeak & Seas, PLLC

(57) ABSTRACT

The radiation beam emitted by a polychromatic source of finite dimension is incident onto an array of microlenses which have the function of converging and dividing the beam into a plurality of microbeams directed towards a matrix containing colored microfilters. Once the microfilters have been passed, the radiation reaches a matrix of microchoppers which can be selected independently from each other by a controller, for generating images.

4 Claims, 8 Drawing Sheets

Prior Art

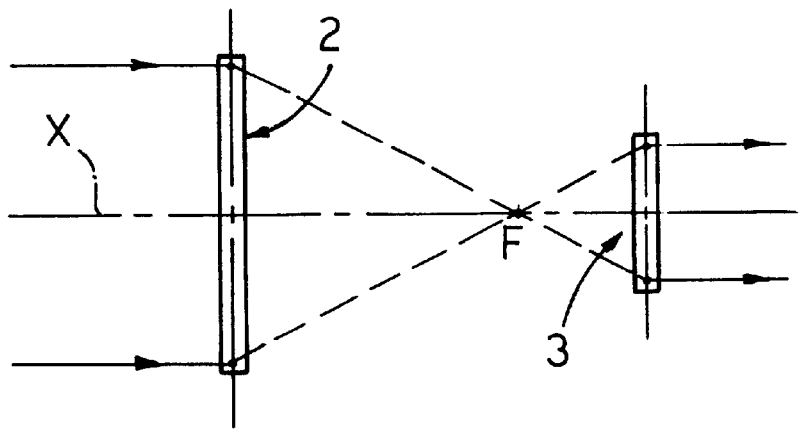
Fig_4A
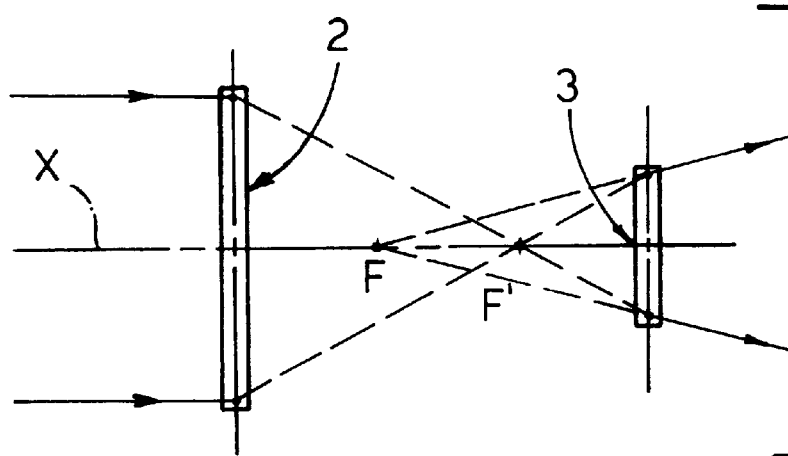
Fig_4B
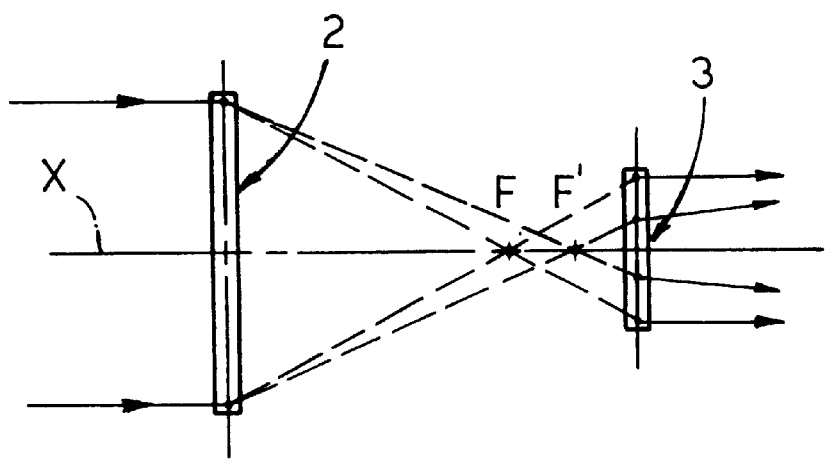
Fig_4C

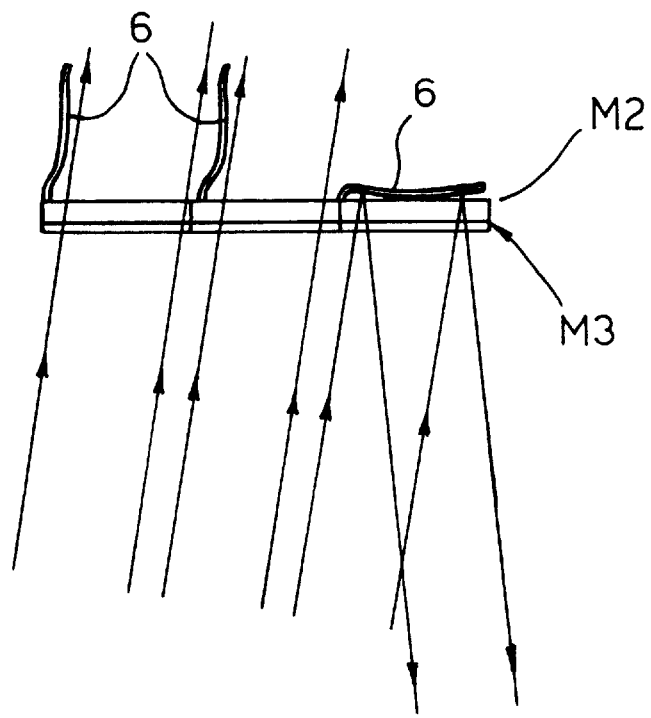
Fig_7A
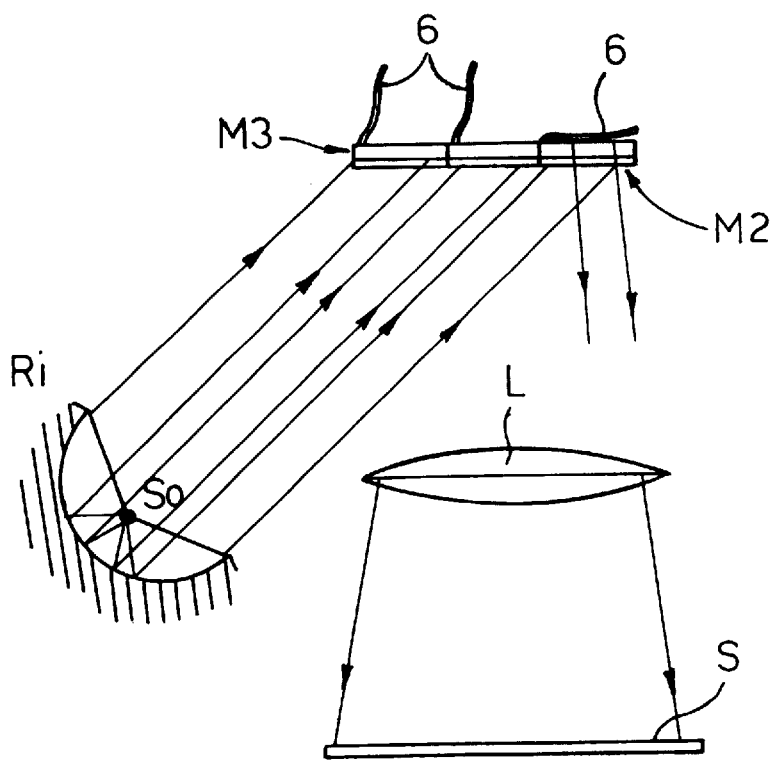
Fig_7B

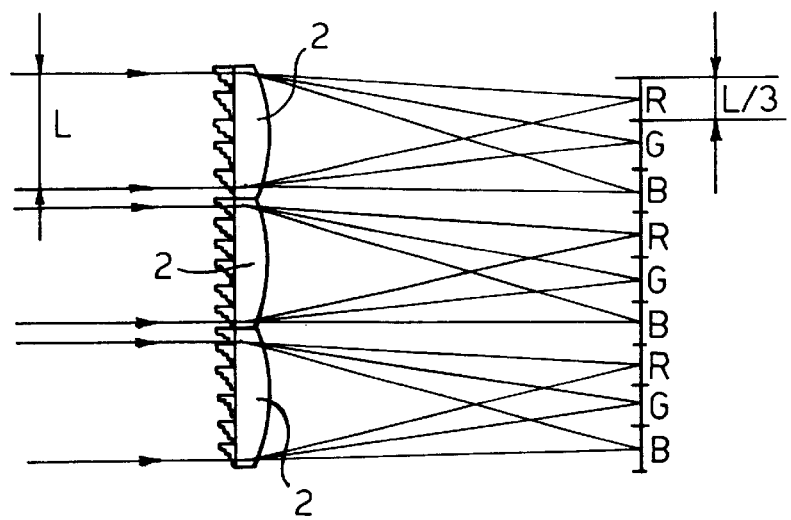
Fig_8
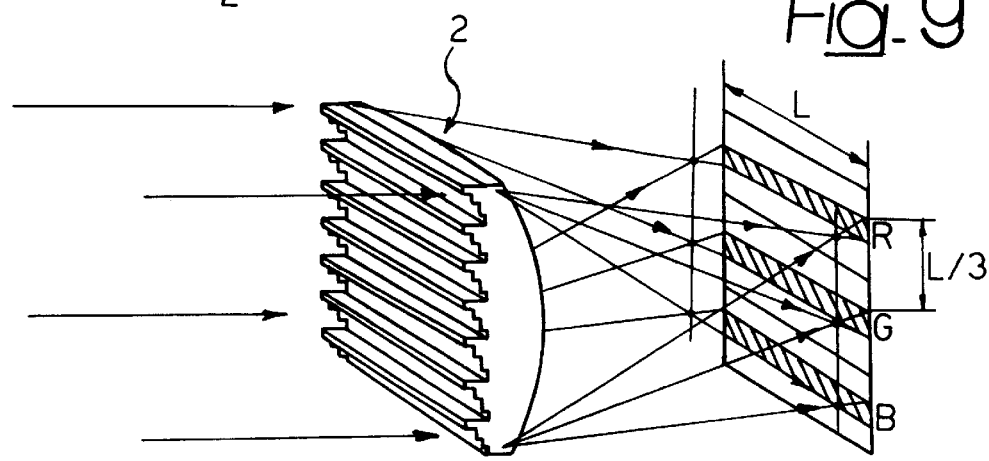
Fig_9
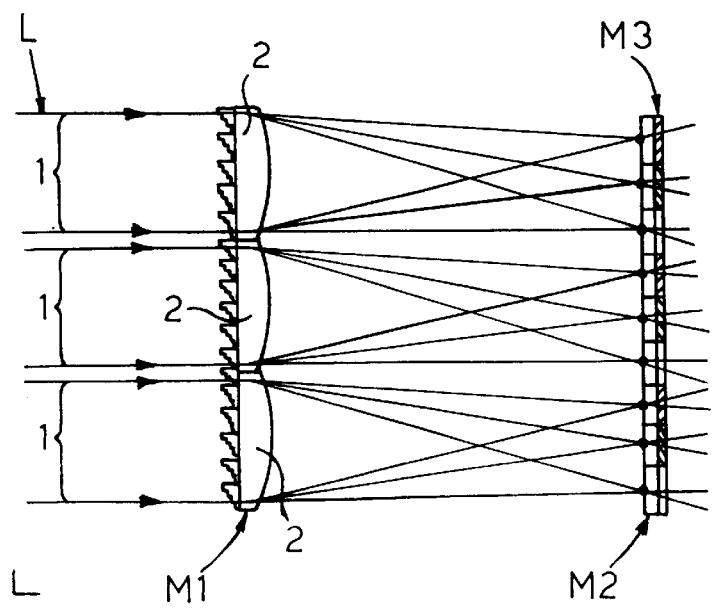
Fig_10

Fig. 11A
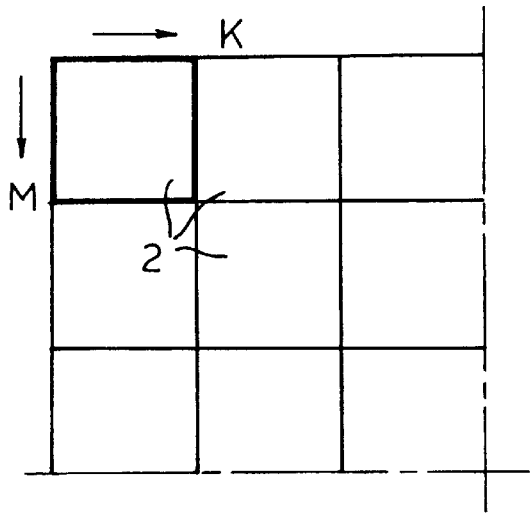
Fig. 11B
Fig. 12A
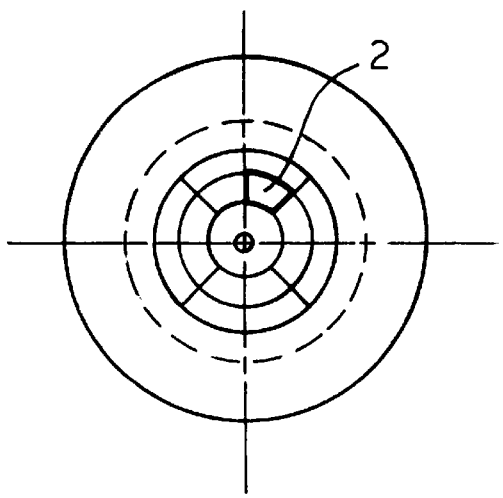
Fig. 12B
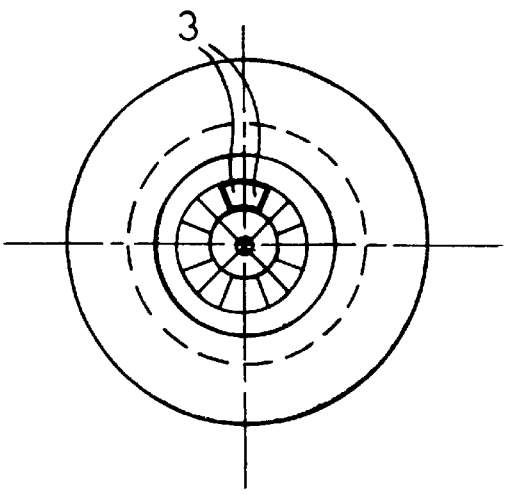

DEVICES WITH MICRO-FILTERS AND MICRO-CHOPPERS FOR DYNAMIC SELECTION OF COLOURS AND IMAGES

FIELD OF THE INVENTION

The present invention relates to the field of optical devices for dynamic display of images.

PRIOR ART

Devices of this type are known which make use of matrix of cells, each of which is able to change its state. Liquid crystal display devices (LCD) having polarizing filters and display devices with micro-mirrors are known. There are two types of liquid crystal projection systems, namely the systems with three LCDs and those with a single LCD. The systems with three LCDs include a source of white light and lenses for dividing the light beam in order to generate three colored beams of the three primary colors red, green and blue; three monochromatic LCDs change the three colored beams into three images. These images are superimposed on each other by three dichroic elements and are finally projected on a screen by a lens. This type of projection system has the advantages of using the whole spectrum of the light source, but is expensive and bulky, since it requires three LCDs and dichroic lenses; furthermore it is difficult to align.

The systems with a single LCD are more compact and less expensive since typically the image of a single color LCD is projected on the screen as it is done with a diapositive projecting device. The type of LCD which is used has a mosaic of colored filters which correspond to each sub-pixel. Less then one third of light passes through the LCD while the remaining portion is absorbed by the mosaic filter. As a result of this, the projectors with a single LCD has a lower brightness then those with three LCDs.

In order to avoid the use of mosaic colored filters, the use is known of a rotating filter described for example by M. Doubler et al in "An improved frame sequential color projector with modified CdSe-TFTs", SID' 91 Digest pages 427–429 (1991).

Another projector with a single LCD and no mosaic filter has been proposed with a square rotating prism described in P. Jansen: "A novel single light valve high brightness HD color projector", EURO Display' 93, pages 249–252 (1993). This system does not have the losses of the mosaic color filters, but requires a memory synchroniser, a high speed LCD and a mechanism for rotating the prism.

The application of a matrix of microlenses coupled to a TFT-LCD panel and a mosaic of colored filters is disclosed for example in H. Hamada et al: "Bright enhancements of a liquid crystal projector by a microlens array", SID' 92 Digest pages 269–272 (1992).

Similarly, the technology has also been applied to the case of the single LCD projection panel and described in T. Takamaatsu et al: "Single panel LCD projector with a planar microlens array", Japan display 92 Digest, page 875 (1992).

A solution of an LCD projector using a matrix of microlenses, but having no mosaic of microfilters is instead disclosed by Sharp Corporation in H. Hamada et al: "A new bright single panel LC-projection system without a mosaic color filter". FIG. 1A of the annex drawings shows the solution, in which three dichroic mirrors 101 arranged downstream of each other divide the white light beam into three beams of the three primary colors red (R), green (G) and blue (B) which are projected on a single TFT-LCD 120 at different angles by a matrix 103 of microlenses 103a (FIG. 1B). To each microlens 103a there are associated three pixels 120a of the TFT-LCD 120. The beams going out of the TFT-LCD 120 are caused to converge by a field lens 106 into a lens 107 for projection on a screen 108. In this solution there are still more problems, since it requires a relatively collimated light beam, since otherwise the dichroic filters would operate in a non efficient way and the use of the dichroic mirrors, which are expensive and can operate only in reflection, would cause a bending of the beam. The liquid crystal panel is still necessary. At each subclass of pixel R or G or B there are applied one of the respective R G B signals. In a solution from DISPLAYTECH, Inc., a liquid crystal of a multi-layer ferroelectric type called "RGB fast filter" can be controlled electronically to pass the red, green or blue colors to pass in a sequential way.

Alternatively, filters which can change the transmitted color are known also with series of twist nematic liquid crystals and polarizing filters. A further alternative is possible also without polarizers with series of layers of high twisted liquid crystals, composed by mixtures of colisteric nematic liquid crystals which are dye-colored, arranged between glasses and coated with an electrically conductive ITO coating.

In all cases making use of liquid crystals, there is the problem of the cost both of the base materials and the required technologies. Another problem is associated to the limited field of temperatures of use; as a matter of fact, liquid crystals cease to operate outside a range between $-20°$ C. and $+80°$ C.

In the field of displays for the projection of static images, a diapositive is illuminated uniformly by a polychromatic beam, and a lens projects the image on a screen. Each time that one wishes to change the image it is necessary to replace the diapositive.

OBJECT OF THE INVENTION

The object of the present invention is that of providing a device for dynamic selection of colors and images which is free from the drawbacks of the prior art.

MAIN FEATURES OF THE INVENTION

In order to achieve this object, the invention provides a device having the features indicated in the annexed claim 1. Further preferred features of the device according to the invention are described in the sub-claims.

In the present invention, the problems of the prior art are overcome by using a matrix of micro-filters and a matrix of electrostatic micro-choppers. The materials are conventional and the technologies required for carrying out the invention are of low cost.

BRIEF DESCRIPTION OF THE DRAWINGS

The invention will be now described with reference to the annexed drawings, given purely by way of non liming example, in which:

FIGS. 4A, 4B, 4C show a microlens and a microfilter respectively in the case in which the focuses of the microlens and the microfilter are coincident, in the case in which they are not coincident and finally in the case in which the microlens has an elongated focus; these figures show that also the microfilters, if they are provided with a curvature and behave on their turn as microlenses, can contribute to the distribution of intensity and the vergence of the light beam.

FIG. 7a shows an embodiment which operates in reflection; the light beam illuminates the microchoppers which act as colored micromirrors of the fundamental colors; the color of one cell composed of three or four choppers may be defined by adjusting the opening time of the microchoppers from which it is constituted; the generation of an image is obtained by selecting the opening of the microchoppers, FIG. 7b shows a possible lighting configuration of the device for displaying or projecting images, FIG. 8 shows a reticulatedmicrolens each dividing the incident polychromatic collimated beam into three separate colored strips; in the solution specifically illustrated in this figure, the lens has a square cross section with side L in the plane of the image modulating system and generates three rectangles with sides L and L/3 which cover the area of the three pixels adjacent to the image modulating system, FIG. 9 shows a perspective view of a detail of a reticulatedmicrolens which carries out the breaking down into three colored strips; in this particular configuration, the microlens is obtained by superimposing a complex diffraction grating which passes the green band in the 0 order and directs the red and blue bands at the orders +1 and −1, with a cylindrical lens which focuses the diffraction orders;

FIG. 10 shows the solution in which the matrices of reticulated microlenses separating the colored bands are followed by the matrix of microfilters; to the spectrum band centred around a color there is associated the filter whose greatest transmission curve is centred around the same color, FIGS. 11A, 11B respectively show a matrix of K×M microlenses and a matrix of 2K×2M microfilters (multi-diapositive) on which there are registered four images constituted by M×K square or rectangular pixels; the microchoppers are in the same number as the colored cells of the microfilters and the selection of the image is carried out by opening the microchoppers corresponding to the cells which define the image; the single image is registered on the multi-diapositive according to the logic of a registered line (or column) alternated to three non-registered lines (or columns), or according to the logic of one registered pixel for each group of four consecutive available pixels; the other lines or columns or pixels are available for the other three images;

FIGS. 12A, 12B show circular matrix of microlenses and microfilters; and

DESCRIPTION OF SOME PREFERRED EMBODIMENT OF THE INVENTION

Figure 1A:
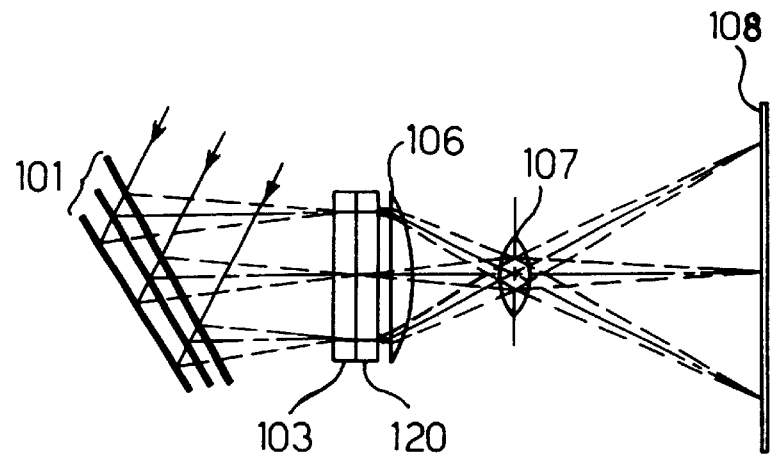
FIGS. 1A, 1B show the known system by Sharp Corporation comprising three dichroic mirrors, a matrix of microlenses, a TFT-LCD and a projection system, FIG. 2 diagrammatically shows an embodiment of the device according to the invention, including a matrix of microlenses followed by a matrix of colored filters and a matrix of micro-choppers; for each microlens, many colored micro filters are provided, FIG. 3 diagrammatically shows a perspective view of a detail of FIG. 2, from which it appears that the distance between microfilters and microlenses is such that the polychromatic beam coming out from a microlens intercepts a single microfilter. The figure shows an example with a square microlens of side L followed by three rectangular red, green and blue microfilters each with a width L and a height L/3.
Figure 1B:
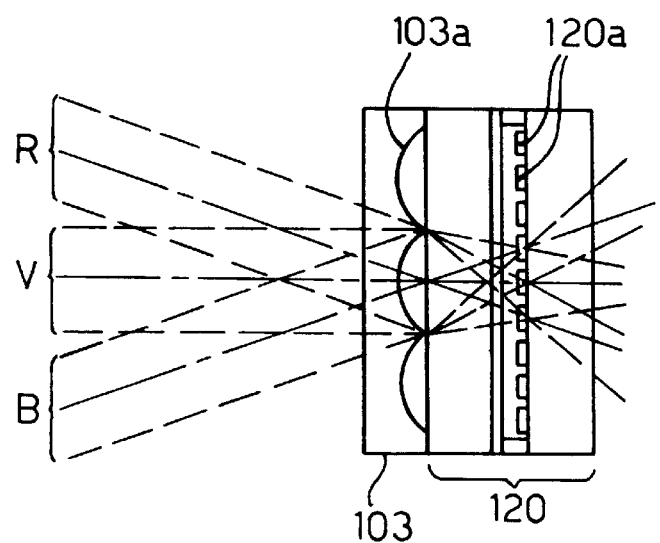
Figure 2:
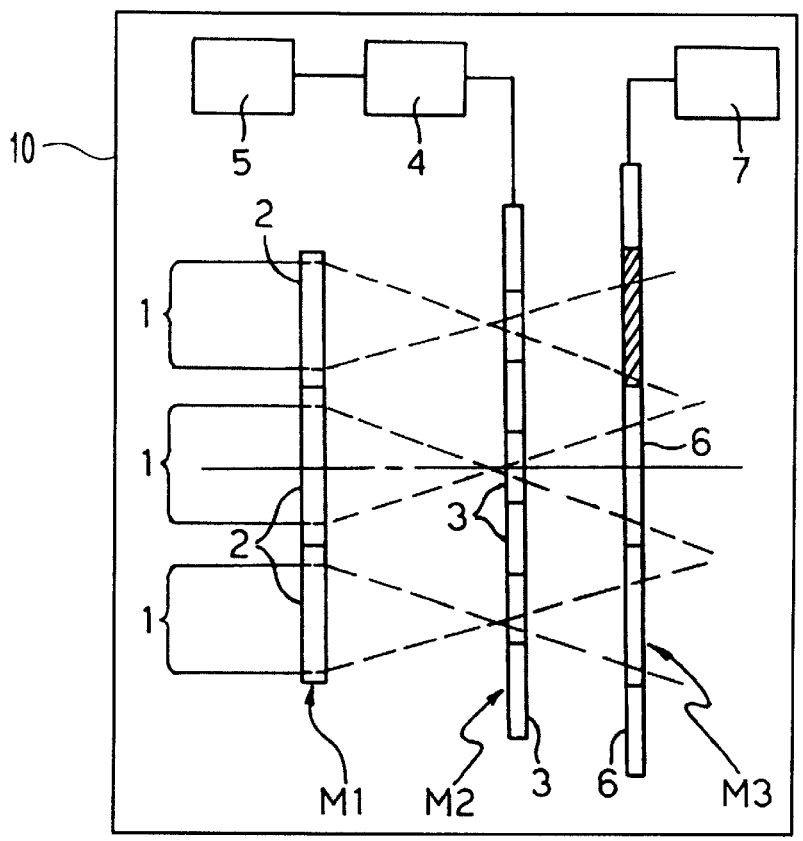

Item 10 in FIG. 2 represents one embodiment of a device for dynamic selection of colors and images.

With reference to FIG. 2, a polychromatic light beam 1 is intercepted by a matrix M1 of microlenses 2. Each microlens 2 causes the intercepting portion of light beam to converge onto a matrix M2 of microfilters 3 which selects the desired colors or images by a translation applied to the matrix M2 by an actuator device 4 controlled by a control processing unit 5. The details of construction relating to the actuator device 4 and the way by which the matrix M2 is displaced in its plane with respect to the microlens matrix M1 are not shown herein, since these means may be provided in any known way and the deletion of these details from the drawings renders the latter simpler and easier to understand. Once it has passed through microfilters 3 the light beam reaches a matrix M3 of microchoppers 6, whose opening and closing movements are controlled by a control processing unit 7.

The size of microfilters 3 is such that the area of each microlens 2 is covered by a plurality of microfilters. In the case of the example illustrated in FIG. 3, the rectangular microlens with sides L and L/N has cooperating filters with side L/N, with N=3 and the filters are of red, green and blue colors.

The distance between the microfilters 3 and microlenses 2 is such that the light beams focused by microlenses 2 are of a lower size than that of the intercepted microfilter 3, also taking into account the non-collimation of the polychromatic beam incident onto microlenses 2 and the residual chromatic aberration in each micro-beam.

If the matrix M2 of the filters 3 is constituted by filters of the three fundamental colors, for each of three different positions in which the matrix M2 can be displaced there is generated a monochromatic beam constituted by a number of elements (pixels) equal to that of microlenses 2. All the fundamental colors sequentially reach the single chopper 6. Therefore, on the matrix 3 of the microchoppers 6, the color of one pixel, or single chopper, can be selected by controlling the opening time of the microchopper 6. By repeatedly activating and deactivating the microchopper, with timings different for each fundamental color, the eye-brain system can be tricked thus giving the impression that one color which in fact is not included among the filters is activated. As a matter of fact, by acting on the opening time $t_1$ of the single primary color, the color perceived can be selected by applying concepts known in colourimetry and photometry. In a first approximation, the color perceived can be expressed by the sum $Rt_1+Gt_2+Bt_3$, where R, G and B are the primary colors and $T_1$ is the exposure time of the color.

If one microlens 2 has a square cross section with side L, square microfilters can be used with side L/N with N≧2 and integer; also rectangular microfilters with cross section of L and L/N dimensions can be used in the case of square microfilters with N=2, to each microlens there correspond $N^2=4$ microfilters. More in general, if the microlens has a non-rectangular cross section, the microfilters 3 will have corresponding shape and size.

In the case of one matrix composed of K×M microlenses (FIG. 11A) we can designate the matrix by $A_{K,M}$ and the single microlens by the term $a_{i,j}$ with i=1,2, . . . K and j=1,2, . . . M. If the microlenses are all the same, for example of rectangular shape with sides L×H and the matrix of microfilters is composed of rectangular elements with dimensions L/N and H/S, we can designate the single microfilter in the matrix of microfilters (FIG. 11B) by the term $(F_{a,b})_{i,j}$ where the indices i,j designate the corresponding microlens and where a=1,2, . . . N and b=1,2, . . . S.

Each microlens 2 generates a microbeam and N×S microfilters correspond to each microlens. The type of microfilter which intercepts the light beam focused by the microlens can be selected by one of the N×S possible positions. The K×M microlenses generate a number of K×M microbeams which cross a number of K×M similar or different microfilters. If the microfilters which have the same indices a,b are all the same, then to each position there corresponds a color of the light beam. Viceversa, multicolour beams or colored images composed of K×M elements can be generated. With all microchoppers opened, the N×S possible images can be used for generating animation effects.

A generalisation of the foregoing description lies in using an optical element on which the filters or images are registered according to gradual variations, rather than in discrete or digital form. The polychromatic light beam described in FIG. 2 can be also generated by a discharge, neon, incandescence, semi-conductor, solid state, polymeric, fluorescence or gas-,source. The beam can be further partially or totally corrected in its vergence by an optical system which operates by free propagation or by a wave guide using the phenomena of reflection, or according to the known systems which operate in refraction, total inner reflection, diffraction or by combinations thereof.

The matrix of microlenses 2 can be constituted by refractive, diffractive, diffractive-refractive hybrid lenses, or lenses with a radial or volume variation of the refraction index. The base material of the matrix of microlenses can be plastic or glass and provided with anti-reflective coatings of the thin film type or diffractive type, in order to improve the efficiency of the transfer of the light beam.

The single microlens can have a rhomboidal, hexagonal, rectangular or square cross section, with a phase function of a spherical or non-spherical lens, or more in general such that by itself or in combination with the adjacent microlenses, by diffractive or combined diffractive-refractive effects, it can generate beams with controlled light divergence and distribution.

To the distribution of the intensity and divergence of the light beam also the microfilters 3 can contribute if they are provided with curvatures and if they behave on their turn as microlenses, such as shown in FIGS. 4A, B, C. In FIG. 4A, each microlens 2 focuses on an optical axis X at the center of a corresponding microfilter 3 and the focuses of the microlens 2 and the microfilter 3 are coincident with each other. In the case of FIG. 4B, these focuses are not coincident, and in the case of FIG. 4C the microlenses 2 and/or microfilters 3 are of the diffractive type with an elongated focus.

Figure 5:
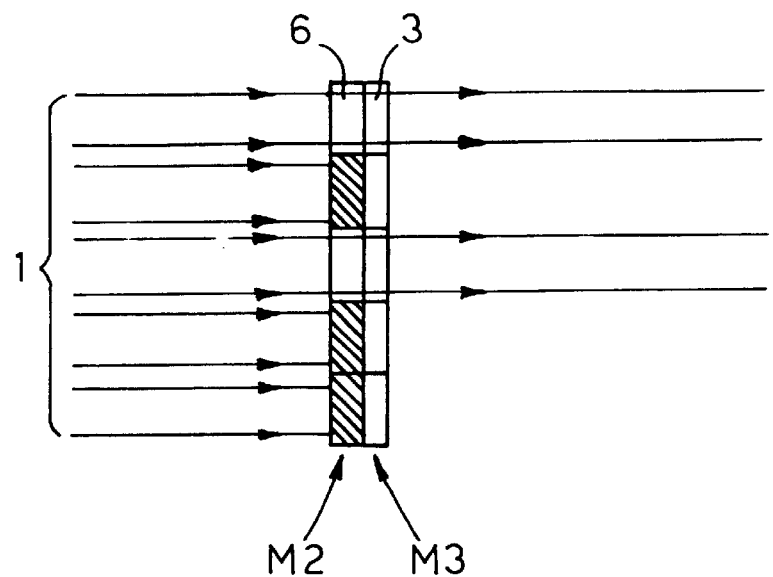
FIG. 5 shows a solution in which the microfilters are arranged downstream of the matrix of micro-choppers; the light beam directly illuminates the micro-choppers and there is no relative movement between filters and microlenses; the microfilters are in a number equal to that of the micro-choppers.

The configuration shown in FIG. 5 is particularly useful. In this configuration the matrix M1 of microlenses and the system 4 for actuating the movement between microlenses 2 and microfilters 3 are eliminated. In this case, the matrix of microchoppers is totally illuminated by the light beam. The microfilters 3 are registered with only the fundamental colors and are placed on the microchoppers support, or on a support in contact with the support of the microchoppers 6. The portion of the beam which reaches the microfilters is selected by the microchoppers 6. The color of one cell constituted by three microchoppers, and thus by three microfilters, of the three fundamental colors, can be selected by adjusting the opening time of each of the three microchoppers.

Figure 6:
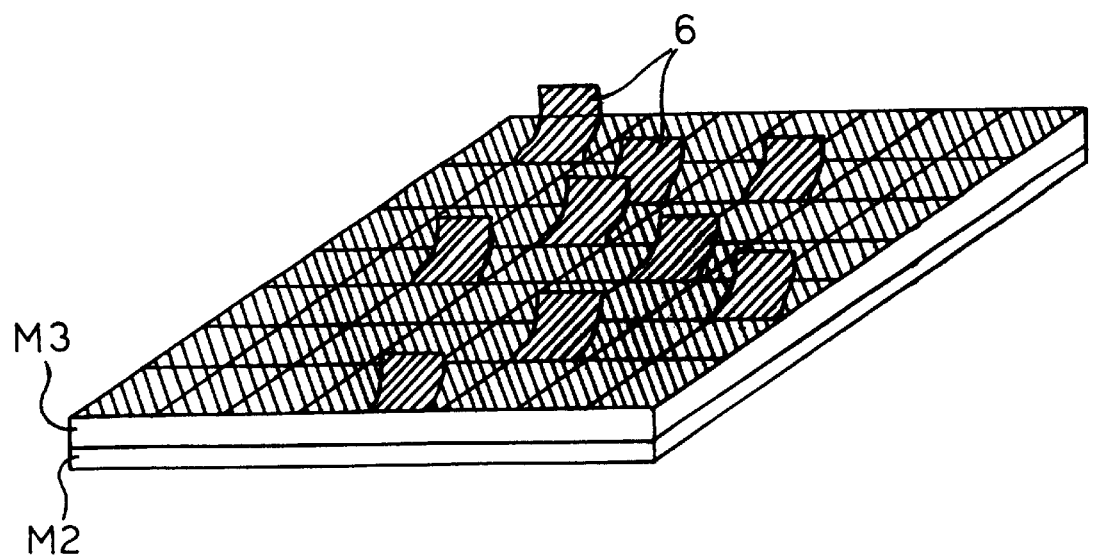
FIG. 6 is a perspective view which shows an embodiment of conductive film eyelash-like microchoppers.
Figure 13:
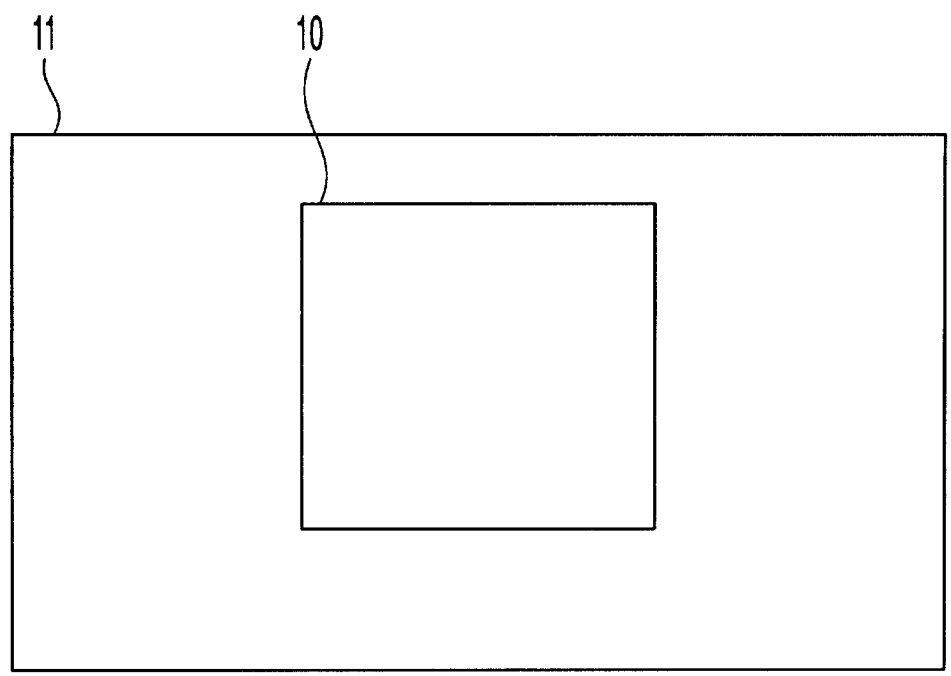
FIG. 13 shows an embodiment of the device being incorporated into a vehicle lighting system.

In a preferred solution, the microchoppers are of the electrostatic film type. In a first solution of a device with high resolution, the opening and closing of the single element having a total aperture of 50μ×25μ has been obtained by a beryllium-copper film with a thickness of 1μ (FIG. 6). With solutions of eyelash-like films of the same beryllium-copper material, no difficulties of manufacture have been encountered for obtaining cells of 10μ² or greater than 25 mm². Although eyelash-like films of the same material can be obviously provided with a greater thickness, the average life or, what is the same, the number of the flexure cycles which are requested for the opening and closing movements, with a thickness in the order of one micron, is practically infinite and therefore a thickness of this value is preferred.

In a further configuration described in FIG. 7A, the light beam illuminates the electrostatic eyelash-like or polymeric film microchoppers 6, which act as micromirrors. Each chopper 6 is preceded by one microfilter 3 colored in one of the primary colors, and the resulting color of one cell composed of three or four choppers can be defined by controlling the opening time of the microchoppers forming this cell. It is possible to eliminate the microfilters 3, by having directly colored microchopper films. The generation of an image is obtained by selecting the opening of the microchoppers. FIG. 7B describes a possible lighting configuration of the device for displaying or projecting images. The polychromatic light beam coming from a source So is directed onto the device by a reflector Ri. A lens L projects the image onto a screen S. If the device is adapted for directly displaying the image, the ambient light is usually sufficient.

The use of a matrix of elements which combine the property of a lens with that of a diffraction grating enables the light beam to be broken down into three separate colored bands centred respectively on the red, green and blue colors. If the polychromatic beam incident onto the matrix of reticulated microlenses is particularly collimated, not only the actuator mechanism for one of the two matrix of lenses, but also the colored microfilters can be eliminated, since the breaking down of the colors is already carried out by the matrix of reticulated microlenses. As a matter of fact, there is a well defined separation of the color bands in the plane of the image modulating system, be it of the TFT/LCD type, or with electrostatic microchoppers. To each reticulated microlens there correspond three microchoppers which selected the color of the beam which must pass. The color of the macro-pixel constituted by the three red, green and blue micro-pixels is defined by the sequence of passage or, which is the same, by the opening times of the single colors (microchoppers).

The single reticulated microlens fulfills two functions, the separation of wave lengths and the shaping and/or focusing of the beam; the two functions can be implemented on two separate projecting surfaces or on a single surface. The first function is provided by a diffraction grating for color separation (H. Damman, "Color separation gratings", Applied Optics 17, pages 2273–2279 (1978)—M. W. Farn, "Conference on binary optics", Nasa publication 3227, pages 409 (1993)); the second function is provided with a lens; the phase function of the lens can be spherical, cylindrical, cross-cylindrical or non spherical. The lens can be of a diffractive, refractive, harmonic diffractive type (D. W. Sweeney "Harmonic diffractive lenses", Applied Optics 34

(1995)) or of a diffractive- refractive hybrid type (G. J. Swanson, "binary optics technology", technical report 854, MIT-Lincoln lab (1989)); by using lenses of diffractive type, the chromatic separation is further strengthened by the strong chromatic aberration.

In the specific embodiment of FIGS. 8, 9, the microlens 2 has a square cross section with side L and generates in the focal plane three rectangular chromatic bands corresponding to the blue, green and red areas of the visible spectrum. The chromatic separation is provided with a grating at N levels.

The grating is designed through the following operations:

1) choice of the central wave length $\lambda_2$;

2) choice of the number of levels N as a function of the side wave lengths $\lambda_1$ and $\lambda_3$ which are to be separated.

The number of levels N is related to $\lambda_1$ and $\lambda_3$ by the relations:

$$\lambda_1 = \lambda_2 = N/(N+1) \text{ and } \lambda_3 = \lambda_2 N/(N-1).$$

The height of each level is given by $d = \lambda_2/[n(\lambda_2)-1]$ where $n(\lambda_2)$ is the refraction index of the material at wave length $\lambda_2$;

3) choice of the period T of the grating as a function of the angular chromatic separation which is to be obtained. Each microcell of side L can contain one or more periods T of the grating.

The grating causes diffraction on all the spectrum wave lengths; in particular $\lambda_2$ is diffracted in the order 0 with an efficiency of 100% and with 0 angular deviation; $\lambda_1$ is diffracted in the order of −1 with an efficiency of 81% and with angular deviation $-\lambda_1/T$ and $\lambda_3$ is deffracted in the order +1 with an efficiency of 81% and with an angular deviation $\lambda_3/T$. By selecting, for example, N=4 and $\lambda_2 = 525$ nm, it results that $\lambda_1 = 420$ nm and $\lambda_3 = 700$ nm.

The diffraction orders are focused in the plane which contains the image modulating system. In a preferred configuration described in FIG. 8 this is done with a single cylindrical microlens having a square cross section and side L, designated by 2, which focuses each wave length into a line of length L. The focal length f of the lens is the same as the distance between the plane of microlenses 2 and the image modulation plane. One single wave length is perfectly focused on the modulation plane and can be selected when designing the microlenses. The distance in the modulation plane between the band centred on $\lambda_1$ and that centred on $\lambda_2$ is $d_{12} = \lambda_1 f/T$, while that centred between $\lambda_2$ and $\lambda_3$ is $d_{23} = \lambda_3 f/T$.

Because of the diffraction limited spot size, the focal line corresponding to the perfectly focused wave length has a side dimension amounting about to $\lambda f/T$. The side dimension of the other lines is generally greater than this value because of the defocus aberration.

The decrease of the overlapping effect of the three bands in the focal plane is mainly due to technological limitations.

In FIG. 9 there is shown in detail a reticulated lens 2 which carries out the breaking down—focusing of the three colored bands.

In the configuration shown in FIG. 8, the efficiency of the light transmission of the image is the greatest. As a result also maximum is the contrast between dark pixels and bright pixels. However, the assumption of using a polychromatic beam with good collimation and uniform on the area of the whole device represents a relevant limitation in design and manufacture. In practice, in order to generate the collimated beam with an extended cross section it is always necessary to have an elongated optical system. The angular separation of the beams of the color bands generated by the single reticulated microlens is limited on its turn by the complexity of technological manufacture. This increases when the angular separation of the focused beams increases.

In another preferred configuration described in FIG. 10, the matrices of reticulated microlenses 2 separating the colored bands are followed by the matrices M2 of colored microfilters 3. To the band of the spectrum centred around color $C_1$ there corresponds the filter whose greatest transmission curve is centred around the same color $C_1$. The function of the microfilter matrix is that of reducing the intersection or overlapping effects of the colored bands generated by the reticulated microlenses. The single colored filter adsorbs or reflects only a small fraction of the incident beam and the overall device is more efficient than that described in FIGS. 3, 4, 5. In this case it is possible to use a non necessarily collimated polychromatic beam and the technological complications associated with the generation of the matrix of reticulated microlenses as well as the problems of intersection or overlapping of the color bands are reduced. The transmission efficiency of the light beam is high, since the filters act only on the corresponding spectrum band and the contrast between the colors is maximum.

In FIGS. 11A, 11B there is shown a system for displaying four static images. On the microfilter matrix there are registered four images of K×M cells (pixels) whose colors may be ether all identical to generate monochromatic images or of any color to generate polychromatic images. The microchoppers are in a number equal to that of the colored cells (microfilters). The selection of the image is carried out by opening the microchoppers corresponding to the cells which define the image. Although it has been verified that the microchopper matrix can be positioned more easily downstream of the multi-diapositive, the device works well also with the microchopper matrix arranged between the polychromatic source and the multi-diapositive.

An animation effect can be easily generated by selecting in sequence images which are slightly different from each other according to known methods applied with cartoons. The advantage of this type of device lies in that for selecting one image there is no need of translation or rotation movements of the diapositive and for opening the microchoppers which define the image there is only the need of a single electric pulse, which imply an easy control processing, if compared with that necessary in the dynamic image modulation systems where each pixel is opened or closed independently from the others.

Figure 3:
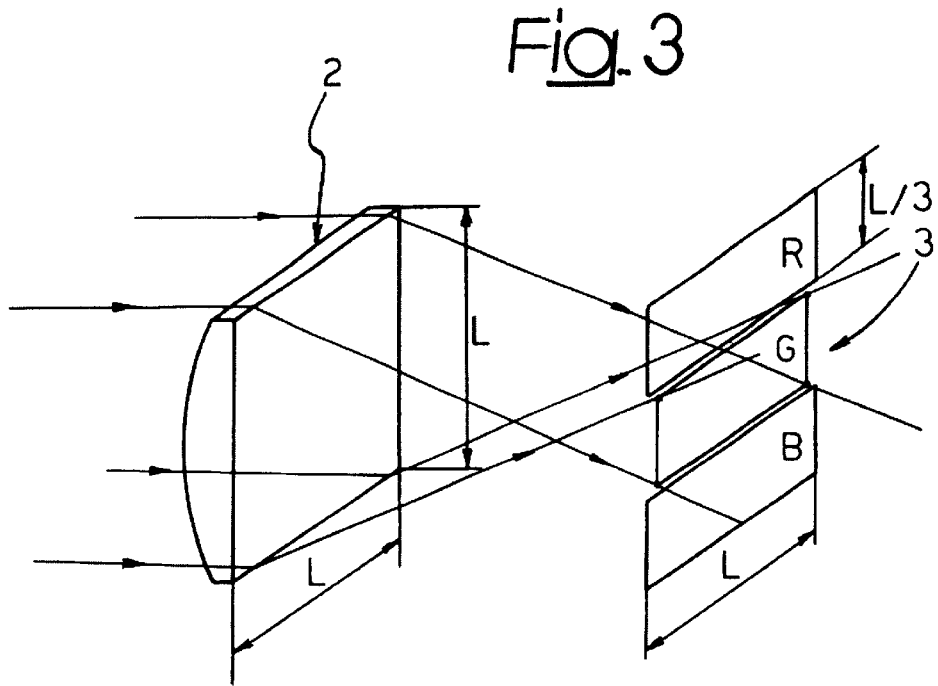

The microlenses and the microfilters can be arranged according to linear matrix as shown for example in FIG. 3, or on circular matrix (FIGS. 12A, 12B) or in a spiral or yet in any other arrangement which, by a translation, or rotation, or inclination, or a combination thereof, of the microlenses relative to the microfilters enables the type of light beam or image to be selected, which comes out from the combination of microlenses, microfilters and microchoppers. In the solution of FIG. 3, where there is a relative movement between microlenses and microfilters, the movement can be applied ether to the microlenses 2 or the microfilters 3 mechanically, electro-mechanically, with induction or capacitive or electrostatic, piezoelectric, polymeric actuators or any other means, as desired.

In general, in devices of this type, if the colored microfilters are also diffusers, the images are clearly visible also looking at the plane of the microfilters from a great incidence angle. Viceversa, if the microfilters transmit the micro beams without diffusing light, the visibility angle of the images in the plane of the colored microfilters is defined by the numerical aperture of the microlenses. This latter case is particularly interesting each time that one wishes to achieve the object of limiting the viewing angle. Examples are the road signals and the on-board information lights of vehicles.

From the foregoing description, it clearly appears that in the device according to the invention the radiation beam emitted by a polychromatic source of finite dimensions is initially corrected in its vergence and distribution by a reflector or a system which operates according to the phenomena of refraction, diffraction, or total inner reflection, is then directed onto an array of microlenses of square, rectangular or arbitrary cross section, which have the function of converging and dividing the beam into a plurality of micro beams directed towards a matrix containing colored microfilters or colored images. Once the microfilters or the images have been passed, the radiation reaches a matrix of microchoppers which can be selected independently from each other by a controller for generating images or colors.

For each single microlens which is present in the matrix of microlenses, the microfilters are in number of 3, 4 or in general in the number of the fundamental colors which is most suitable to generate any color. The dimension of the colored microfilters is such that they intercept the converging beam partially o totally. The selection of the color of the single cell is obtained by interposing the desired color in the light beam. A movement of the base plate of microfilters enables the color to be changed. The size of the microchoppers is the same as that of the microlenses. The cross section of the filters and the type of lens used enables colored patterns to be generated having the desired light distribution. Embodiments have been also shown which do not employ the movement of the microfilter plates, in which the portion of the beam which reaches the microfilters is selected by the microchoppers and the color of one cell constituted by three microchoppers, and thus by three microfilters of the fundamental colors, can be selected by adjusting the opening time of each of the three microchoppers.

It has been demonstrated that the polychromatic beam can be broken down into colored bands by reticulated microlenses. This enables devices without microfilters as well as other embodiments, easier to be manufactured, which can be used also with non perfectly collimated polychromatic beams, with microfilters which intercept only the corresponding spectrum bands, to be made.

FIG, 13 show an embodiment of the device being incorporated int a vehicle lighting system 11. Examples of vehicle lighting systems include a headlamp for signaling dangerous situation with colered intermittent beams, a headlamp with braking indicators included therein, a headlamp for signaling a U turn, and a headlamp for projecting colered beams.

Naturally, while the principle of the invention remains the same, the details of construction and the embodiments may widely vary with respect to what has been described and illustrated purely by way of example, without departing from the scope of the present invention.

What is claimed is:

1. Device for the dynamic selection of colors and images, wherein it comprises:

a polychromatic light beam generator, a plurality of reticulated microlenses arranged in a matrix, integrated in a thin transparent material, said microlenses having the function of generating three beams of color bands centered on a defined wave length, each microlens of the matrix being able to generate many rectangular focused beams focused on respective different areas corresponding to adjacent pixels of an image modulator, a matrix of colored microfilters with transmittance peaks corresponding to the central wave length of the color bands generated by the matrix of reticulated microlenses, having the function of increasing the contrast or improving the separation or eliminating the problems associated with overlapping (cross talk) of the color bands, said microfilters been interposed between the image modulator and the reticulated microlens matrix.

2. Device according to claim 1, wherein the image modulator is of the TFT/LCD type.

3. Device according to claim 1, wherein the image modulator comprises electrostatic microchoppers of the eyelash type, or of the polymeric film type, a field lens and a projecting lens.

4. Device according to claim 1, in which the microlenses are constituted by a matrix of K×M converging microlenses of rectangular cross-section, with sides L, H and the microfilters are in number N×S and sides L/N, H/S where K, M, N, S are intergers.

* * * * *